(12) United States Patent
Boggs et al.

(10) Patent No.: US 10,963,448 B1
(45) Date of Patent: Mar. 30, 2021

(54) NON-RESPONSIVE NODE ACTIVITY AVOIDANCE

(71) Applicant: Teradata US, Inc, Dayton, OH (US)

(72) Inventors: Gary L. Boggs, San Deigo, CA (US);
Eric M. Shank, San Diego, CA (US);
Franklin F. Meng, Temecula, CA (US)

(73) Assignee: Teradata US, Inc., San Diego, CA (US)

( * ) Notice: Subject to any disclaimer, the term of this patent is extended or adjusted under 35 U.S.C. 154(b) by 1479 days.

(21) Appl. No.: 14/210,406

(22) Filed: Mar. 13, 2014

Related U.S. Application Data

(60) Provisional application No. 61/798,878, filed on Mar. 15, 2013.

(51) Int. Cl.
G06F 16/23 (2019.01)
(52) U.S. Cl.
CPC ................. G06F 16/2365 (2019.01)
(58) Field of Classification Search
CPC ............. G06F 11/141; G06F 17/30091; G06F 11/0727; G06F 17/30097; G06F 17/30867
See application file for complete search history.

(56) References Cited

U.S. PATENT DOCUMENTS

| | | | |
|---|---|---|---|
| 2011/0145578 A1* | 6/2011 | Asano | H04L 9/0866 713/169 |
| 2014/0359054 A1* | 12/2014 | Kuznetsov | H04L 67/1097 709/217 |

* cited by examiner

*Primary Examiner* — Truong V Vo
(74) *Attorney, Agent, or Firm* — Randy L. Campbell, Jr.

(57) ABSTRACT

A method of operating a data store system may include identifying a non-responsive processing node from a plurality of processing nodes. The method may further include generating a new registration key in response to identifying the non-responsive processing node. The method may further include providing the new registration key to the other processing nodes of the plurality of processing nodes excluding the identified non-responsive node. Each processing node provided the new registration key may be authorized to access a plurality of storage devices of a storage array in communication with the plurality of processing nodes. A system and computer-readable medium may also be implemented.

20 Claims, 7 Drawing Sheets

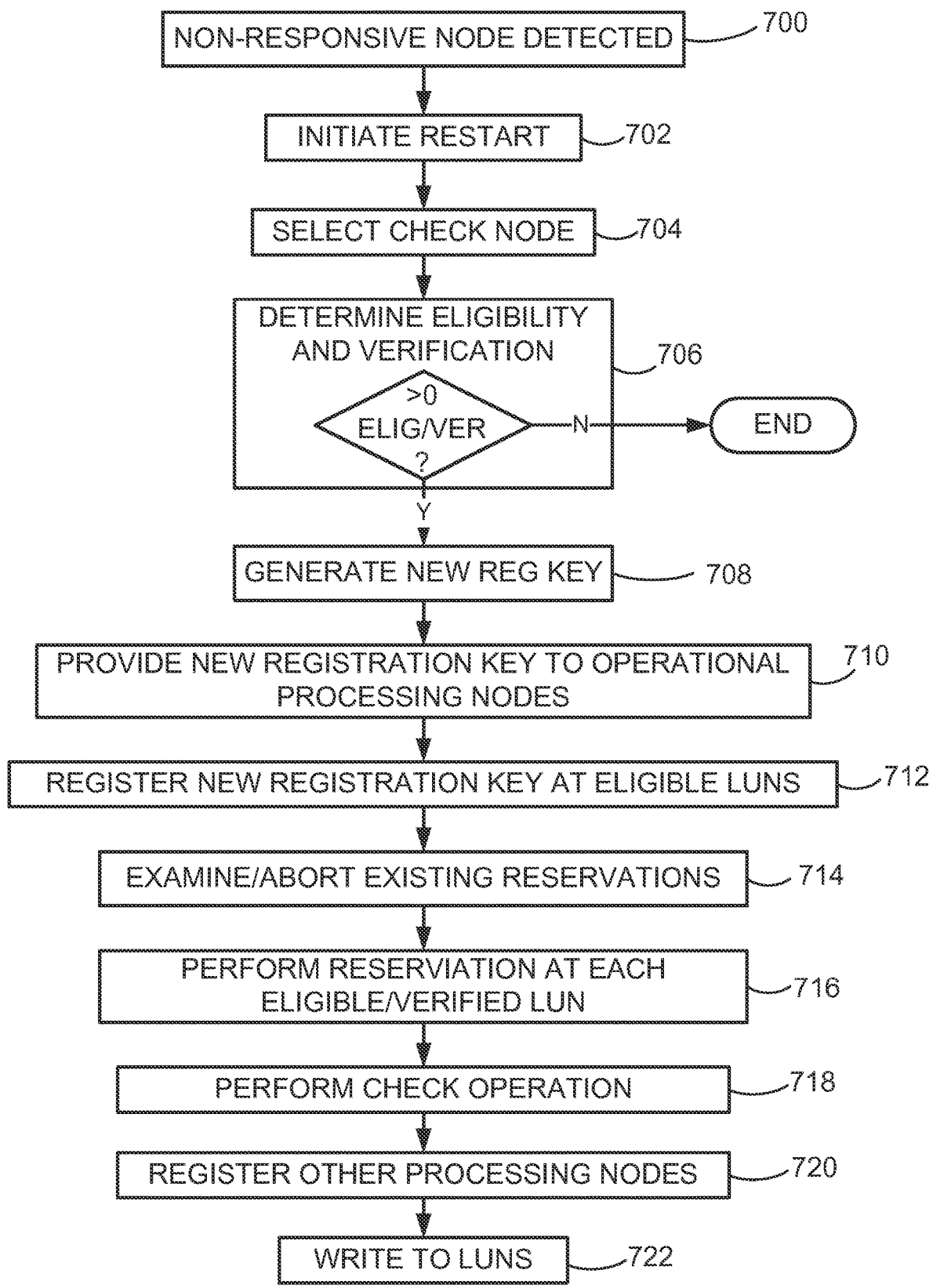

NON-RESPONSIVE NODE ACTIVITY AVOIDANCE

CLAIM OF PRIORITY

This application claims the benefit of priority under 35 U.S.C. § 119(e) of U.S. Provisional Patent Application Ser. No. 61/798,878 filed on Mar. 15, 2103, which is hereby incorporated by reference herein in its entirety.

BACKGROUND

1. Technical Field

The present disclosure relates generally to maintaining integrity of database data, and more particularly to, avoiding effects of unauthorized database manipulation by failed components within a database system.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Database systems and other data stores may include numerous processing nodes used to execute database queries, as well as other database utility operations. In some scenarios, a processing node may fail to appropriately respond to the other processing nodes in the system, but may still be capable of performing input/output (I/O) to the disks storing database data. In this situation, even though the other processing nodes may be able to perform the responsibilities of the failed node, the failed node may continue to run. This results in two processing nodes running at least some of the same processes, which may both independently write to the same disks. This condition can result in undesirable manipulation of the database data.

SUMMARY

According to one aspect of the present disclosure, a method of operating a data store system may include identifying a non-responsive processing node from a plurality of processing nodes. The method may further include generating a new registration key in response to identifying the non-responsive processing node. The method may further include providing the new registration key to the other processing nodes of the plurality of processing nodes excluding the identified non-responsive node. Each processing node provided the new registration key may be authorized to access a plurality of storage devices of a storage array in communication with the plurality of processing nodes.

According to another aspect of the disclosure, a computer-readable medium may be encoded with a plurality of instructions executable by a processor. The plurality of instructions may include instructions to identify a non-responsive processing node from a plurality of processing nodes. The plurality of instructions may further include instructions to generate a registration key in response to identification of the non-responsive processing node. The plurality of instructions may further include instructions to provide the new registration key to a subset of processing nodes of the plurality of processing nodes. The subset of processing nodes excludes the identified non-responsive node. Each processing node provided the new registration key may be authorized to access a plurality of storage devices of a storage array in communication with the plurality of processing nodes.

According to another aspect of the disclosure, a data store system may include a storage array that includes a plurality of storage devices. The data store system may further include an array of processing nodes in communication with the storage array, wherein at least one of the processing nodes is a non-responsive node. The data store system may further include a coordination module. The coordination module may be executed by at least one processor to cause the at least one processor to generate a new registration key. The coordination module may be further executed by at least one processor to cause the at least one processor to provide the new registration key to the plurality of processing nodes excluding the identified non-responsive node. Each processing node provided the new registration key may be authorized to access the plurality of storage devices of a storage array in communication with the plurality of processing nodes.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 is an operational flow diagram of example operation of a database system.

DETAILED DESCRIPTION OF THE FIGURES

Figure 1:
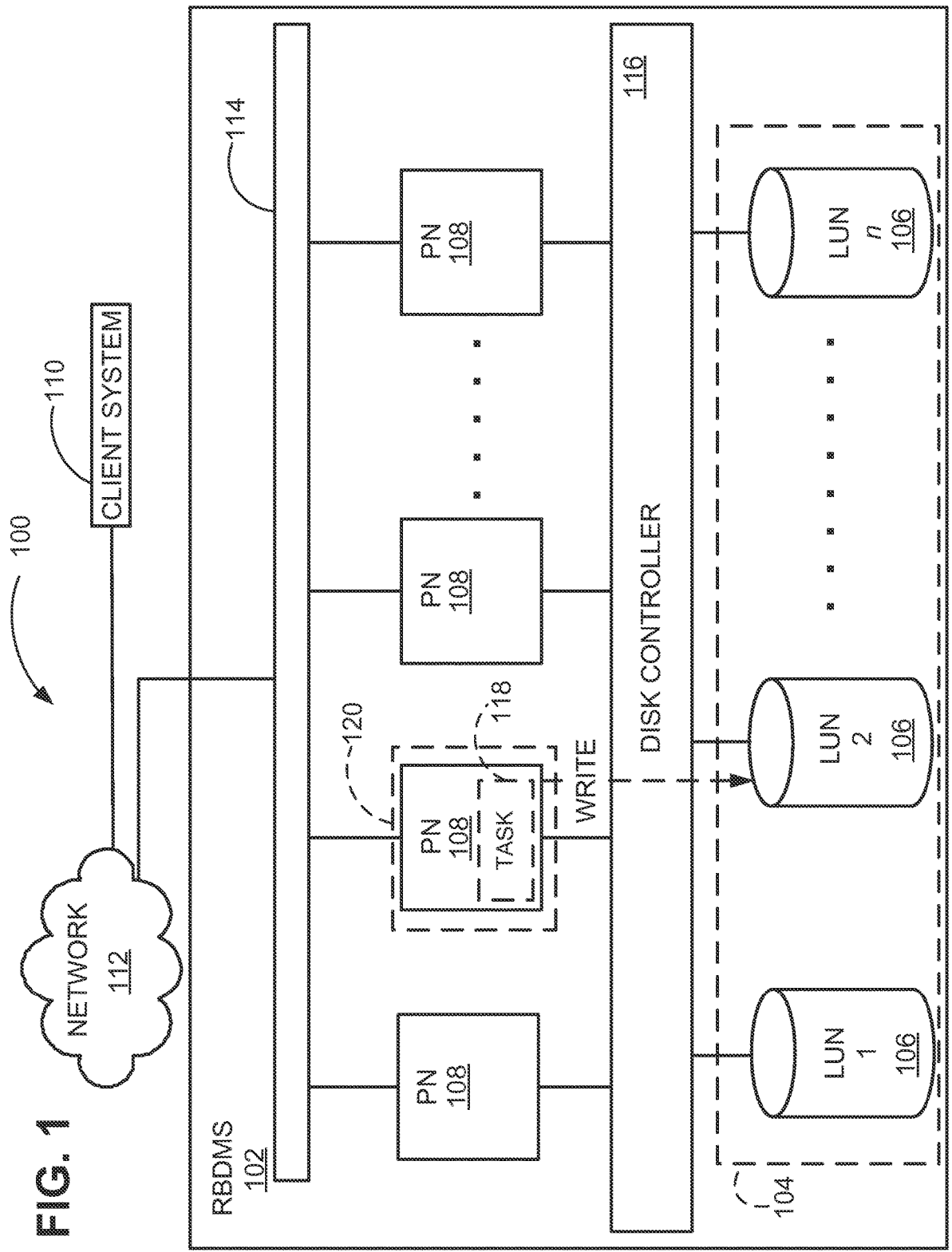
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. In alternative examples, the RDBMS 102 may implement a single processing unit, such as in a symmetric multiprocessing (SMP) system configuration. The RDBMS 102 may include one or more processing units used to manage the storage, retrieval, and manipulation of data in data storage facilities (DSFs) 104. In one example, the DSFs 104 may include a plurality of disks, which may include hard drives, flash drives, and any other persistent storage devices. The disks of the DSFs 104 may be organized into a plurality of logical unit numbers (LUNs) 106, with each LUN 106 representing logical locations in one or more physical storage devices included in the DSFs 104. In FIG. 1, the LUNs 106 are individually designated as LUN 1 through LUN n.

Figure 2:
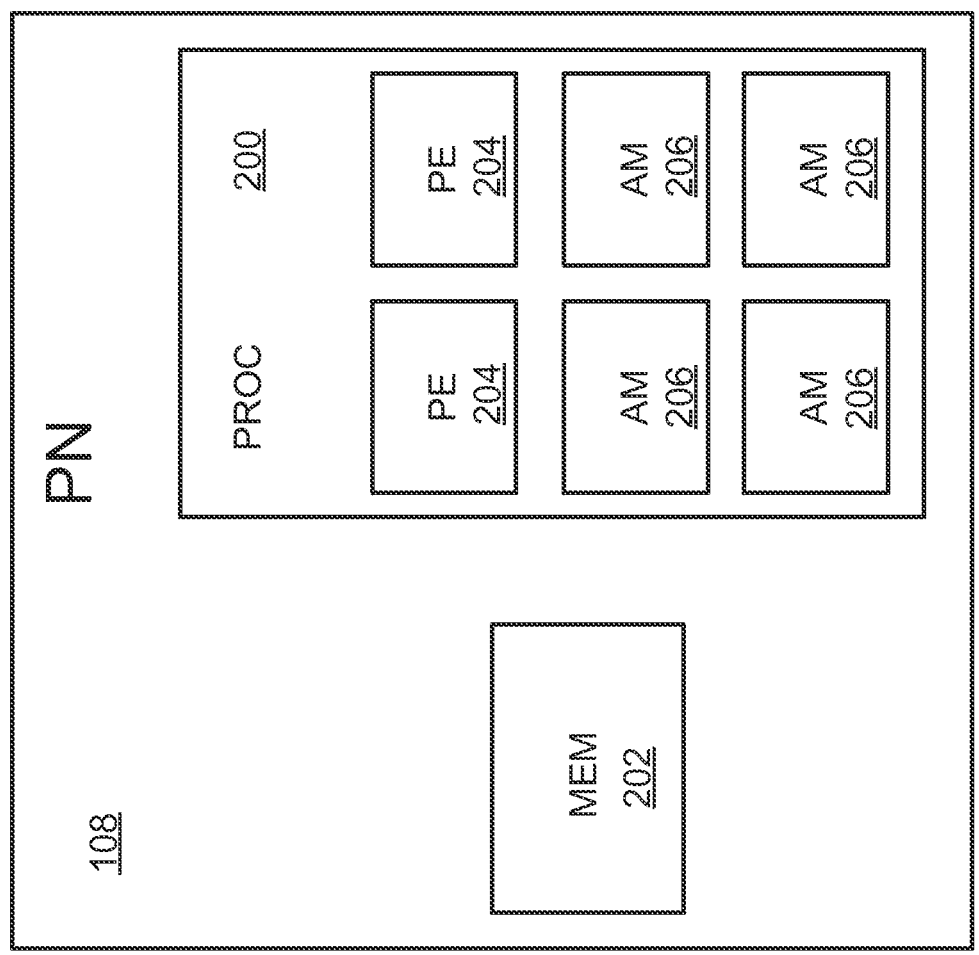
FIG. 2 is a block diagram of a portion of the example database system of claim 1.

The array of processing units may include an array of processing nodes 108 that manage the storage, retrieval, and manipulation of data included in a database. FIG. 2 provides an example of a processing node 108. Each processing node 108 may include one or more physical processors 200 and memory 202. The memory 202 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 200 such as multiprocessing, multitasking, parallel processing and the like, for example.

As shown in FIG. 2, each processing node 108 may include one or more other processing unit arrays such as parsing engine (PE) modules 204 and access modules (AM) 206. As described herein, each module, such as the parsing engine modules 204 and access modules 206, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memories 202, for example, that comprise instructions executable with the processors 200 or other processors to implement one or more of the features of the module. When any one of the modules includes the portion of the memories 202 that comprise instructions executable with the processors 200, the module may or may not include the processors 200. In some examples, each module may just be the portion of the memories 202 or other physical memory that comprises instructions executable with the processors 200 or other processor to implement the features of the corresponding module without the module including any other hardware. Because each module includes at least some hardware even when the included hardware comprises software, each module may be interchangeably referred to as a hardware module, such as the processing engine hardware module 204, and the access module hardware module 206. The access modules 206 may be access modules processors (AMPs), such as those implemented in the Teradata Active Data Warehousing System®.

The parsing engine modules 204 and the access modules 206 may each be virtual processors (vprocs) and/or physical processors. In the case of virtual processors, the parsing engine modules 204 and access modules 206 may be executed by one or more physical processors, such as those that may be included in the processing nodes 108. For example, in FIG. 2, each parsing engine module 204 and access module 206 is associated with a respective processing node 108 and may each be executed as one or more virtual processors by physical processors 200 included in the respective processing node 108.

Each processing node 108 may include multiple parsing engine modules 204 and access modules 206 such that there are more parsing engine modules 204 and access modules 206 than processing nodes 108. In one example, during operation, the one or more physical processors 200 included in the processing nodes 108 may execute the parsing engine modules 204 and access modules 206 by switching between the executions of the various modules at a rapid rate allowing the vprocs to substantially operate in "parallel."

Database data, such as database tables, may be stored in various formats, such as row or columnar format. Each parsing engine module 204 may organize the storage of data and the distribution of database tables. The parsing engine modules 204 may also coordinate the retrieval of data from the DSFs 104 in response to queries received, such as those received from a client computer system 110 connected to the RDBMS 102 through connection with a network 112. The network 112 may be wired, wireless, or some combination thereof. The network 112 may be a virtual private network, web-based, directly-connected, or some other suitable network configuration. In one example, the client computer system 110 may run a dynamic workload manager (DWM) client (not shown). Alternatively, the database system 100 may include a mainframe (not shown) used to interact with the RDBMS 102.

An interconnection 114 allows communication to occur within and between each processing node 108. For example, implementation of the interconnection 114 provides media within and between each processing node 108 allowing communication among the various processing units. Such communication among the processing units may include communication between parsing engine modules 204 associated with the same or different processing nodes 108, as well as, communication between the parsing engine modules 204 and the access modules 206 associated with the same or different processing nodes 108. Through the interconnection 114, the access modules 206 may also communicate with one another within the same associated processing node 108 or other processing nodes 108.

The interconnection 114 may be hardware, software, or some combination thereof. In instances of at least a partial-hardware implementation the interconnection 114, the hardware may exist separately from any hardware (e.g, processors, memory, physical wires, etc.) included in the processing nodes 108 or may use hardware common to the processing nodes 108. In instances of at least a partial-software implementation of the interconnection 114, the software may be stored and executed on one or more of the memories 202 and processors 200, respectively, of the processor nodes 108 or may be stored and executed on separate memories and processors that are in communication with the processor nodes 108. In one example, interconnection 114 may include multi-channel media such that if one channel ceases to properly function, another channel may be used. Additionally or alternatively, more than one channel may also allow distributed communication to reduce the possibility of an undesired level of communication congestion among processing nodes 108.

During operation the, each access module 206 may be associated with dedicated portions of the LUNs 106 on which data is stored and accessed. This "shared nothing" architecture ensures that each access module 206 has exclusive access to particular logical portions of the physical disks of the data storage facilities 104. A disk controller 116 may be implemented to control access to the LUNs 106. The disk controller 116 may be responsible for analyzing credentials associated with a particular access module 206 seeking access of the LUNs 106, such as during any read or write activities.

In one example, an access module 206 of a processing node 108 may be processing a task 118 associated with LUN 2. During operation, this processing node 108 may fail such that it becomes non-responsive to additional commands, designated in FIG. 1 as non-responsive node 118. In one example, when a failed processing node 108 is detected, the access modules 206 may be "moved" to another processing node 108. In other words, responsibilities of the access modules 206 of the non-responsive node 120 may be transferred to access modules 206 of properly-functioning processing nodes 108. However, the non-responsive node 120 may continue to execute the task 116 or any other tasks assigned prior to failure. This may result in the non-responsive node 120 continuing to write to the dedicated portions of the LUN 2, while another processing node 108 may be also attempting to write the LUN 2 due to receiving the access modules 206 of the non-responsive node 118.

Figure 3:
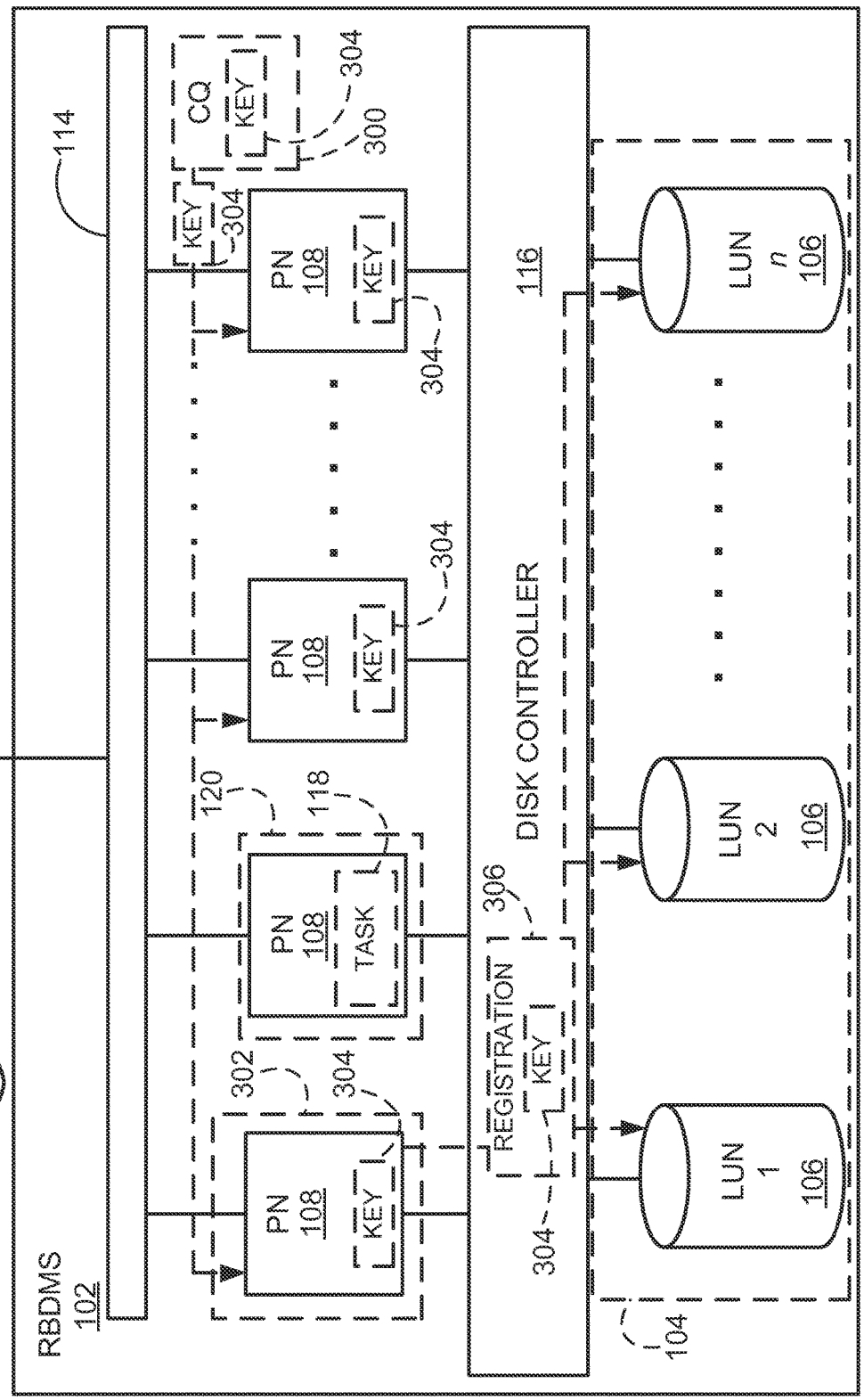
FIG. 3 is a block diagram of the example database of FIG. 1 during a non-responsive node avoidance scheme execution.

In one example, the RDBMS 100 may implement a single registration key used by all eligible processing nodes 108 in order to access a LUN 106. In FIG. 3, the RDBMS 102 may have determined that the non-responsive node 120 is not operating in a desired manner. In this case, a system restart of the RDBMS 102 may be initiated. In one example, upon system restart, the startup process may involve a clique coordinator 300, as shown in FIG. 3. In one example, the processing nodes 108 may operate in distinct groups referred to herein as "cliques." Each processing node 108 of a clique may share access to the same physical disks of the DSFs 104. In addition, processing nodes 108 of the same clique may be chosen to take on responsibilities of a failed processing node 108. In one example, the clique coordinator 300 may be a module that is included in operations associated with maintaining data storage arrangements in the DSFs 104, such as Teradata Virtual Storage® (TVS) systems by Teradata Corporation of Dayton, Ohio. The clique coordinator 300 may be executed on one or more of the processing nodes 108 or from other processors within or external to the database system 100. During startup, the clique coordinator 300 may be responsible for determining the processing nodes 108 making up each clique. In one example, a processing node 108 may be designated with particular responsibilities regarding registration of the new key. This processing node 108, referred to as check node 302 herein, may be selected based on various criteria. In one example, each processing node 108 may be assigned a number as an identifier within the database system 100. The lowest-numbered, properly-operating processing node 108 may be selected as the check node 302. The check node 302 may also be selected by the clique coordinator 300.

In order to prevent non-responsive nodes from writing to the LUNs 106 of the physical disks of the DSFs 104, a registration key may be used to allow only properly-functioning processing nodes 108 to write to the LUNs 106 of the DSFs 104. However, in order for a registration key to be applicable to a LUN 106, the LUN 106 must be eligible. Eligibility may be determined by the check node 302 and may depend on one or more eligibility-determination criterion. The eligibility of the LUN 106 may depend on whether or not the physical disk(s) of the LUN 106 is accessible by the check node 302. If the physical disk(s) of a particular LUN 106 is not accessible, any LUNs 106 of the physical disk(s) are ineligible to be used with the new registration key.

Other criteria may be implemented to determine LUN 106 eligibility. For each physical disk that is accessible from the check node 302, a determination may be made as to whether a physical disk is a block device and that the physical disk name references a partition on a block device. If not, LUNs 106 associated with this are ineligible. A determination as to whether a flag allowing non-operational processing nodes access to the LUNs 106 is set may also be made. If the flag is set, the LUN 106 is ineligible. Identification of the LUN 106, without the partition number, may be made a well. The criteria may be used in various combinations containing all or fewer of those listed. Additional criteria may be used with or replace those explicitly listed.

For each unique LUN 106 found, verification that all partitions of the LUN 106 are referenced by a non-skipped physical disk link, an alignment partition, or are unused may be made. In one example, alignment partitions may reference small partitions (e.g. <3872 sectors) at the front of the physical disk that are used to start the physical disks partitions on a particular sector boundary. If a LUN 106 fails this verification, it is to be skipped. For each unique LUN 106, verification may also be made regarding that each unique LUN 106 or corresponding physical disk(s) support persistent reservation functions, such as those included in small computer system interface (SCSI)-3 and later protocols. If a LUN 106 or corresponding physical disk(s) do not support such functions, the LUN 106 is skipped.

In one example, during the startup process a new registration key 304 may be generated by the clique coordinator 300. The new registration key 304 may contain various identifiers. In one example, the new registration key 304 may be 8 bytes in length. Two bytes may be used to identify the RDBMS 102 implementing the key. Two different bytes may be used to identify the particular processing node 108 performing the key reservation for the new registration key 304. Two other bytes may be used to identify the number of the particular operating cycle of the RDBMS 102. In one example, each time the RDBMS 102 is restarted, a cycle counter may be incremented. The cycle counter represents the number of startups and/or restarts, which may be represented by two bytes of the new registration key 304. The final two bytes may represent the number of processing nodes 108 currently operating in the RDBMS 102 in a proper fashion. Thus, this number excludes non-responsive nodes. Alternative examples may include registrations keys with fewer or additional bytes, different byte orders, and/or byte representations.

In FIG. 3, the new registration key 304 is generated by clique coordinator 300 and provided to each of the processing nodes 108. Via instructions from the clique coordinator, the check node 302 may register the new registration key 304 through registration operation 306 with each eligible LUN 106 of an eligible physical disk. The registration operation 306 may be performed at the disk controller level, such that the disk controller 116 interacts with the check node 302 to perform the registration 306. Registration may include recognition by the disk controller 116 that the new registration key 304 will be currently used as credentials for I/O operations performed by the processing nodes 108. In one example, registration of the new registration key 304 may include overtaking any existing reservations currently existing with each eligible LUN 106.

Figure 4:
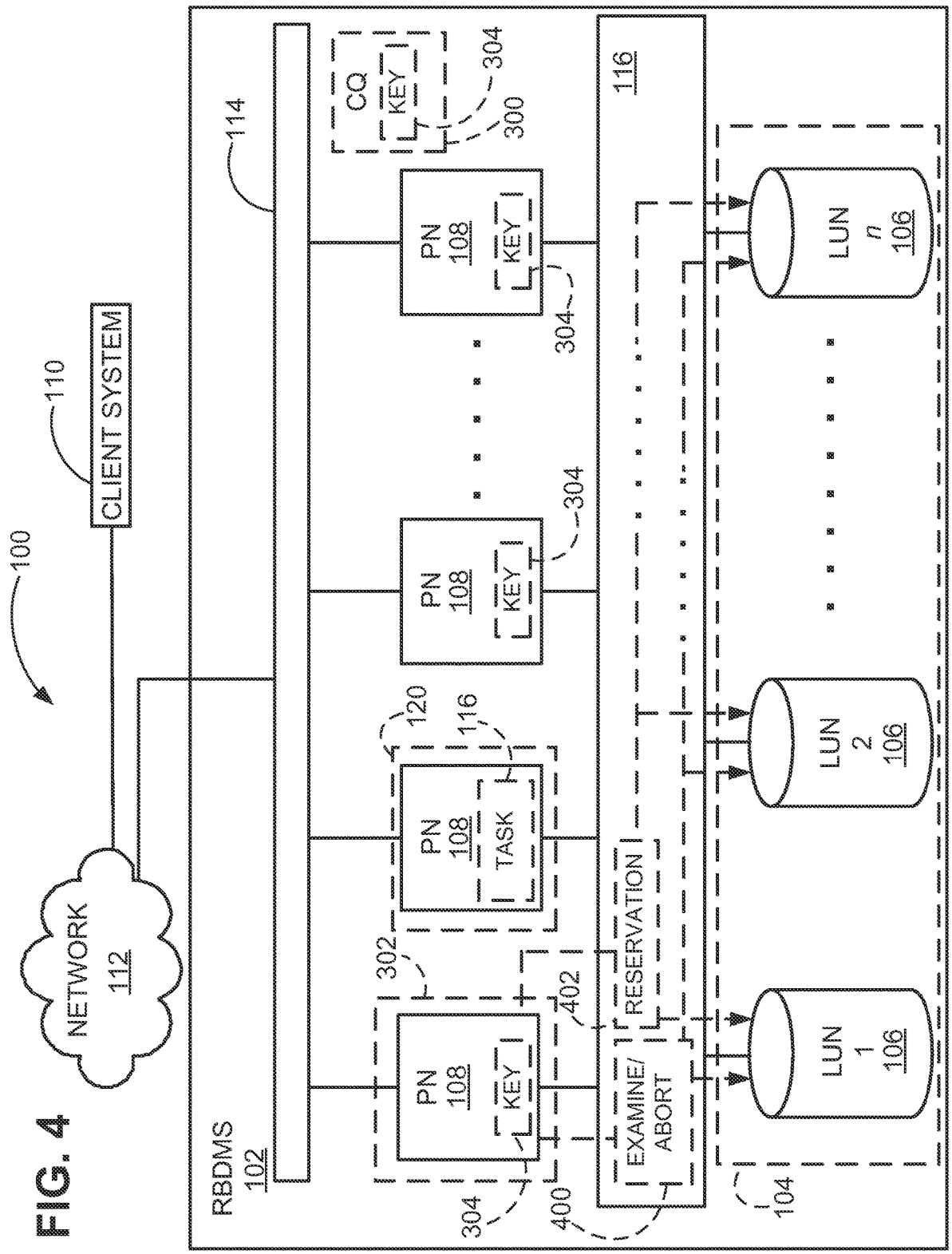
FIG. 4 is another block diagram of the example database of FIG. 1 during the non-responsive node avoidance scheme execution.

After registration, the check node 302 may perform an examination of existing reservations and abort if presented. Through the examine/abort operations 400 (see FIG. 4), the check node 302 may query each LUN 106 via the disk controller 112 to determine if the queried LUN 106 includes a previously registered key for the database system 100. If so, the check node 302 may issue a command at the queried LUN 106 to cut off any processing nodes 108 from performing I/O operations using the old registration key. In one example, this may include removal of any previously registered keys for the database system 100. Any foreign keys, e.g., keys belonging to systems other than the RDBMS 102, may be ignored during the registration 306.

Figure 5:
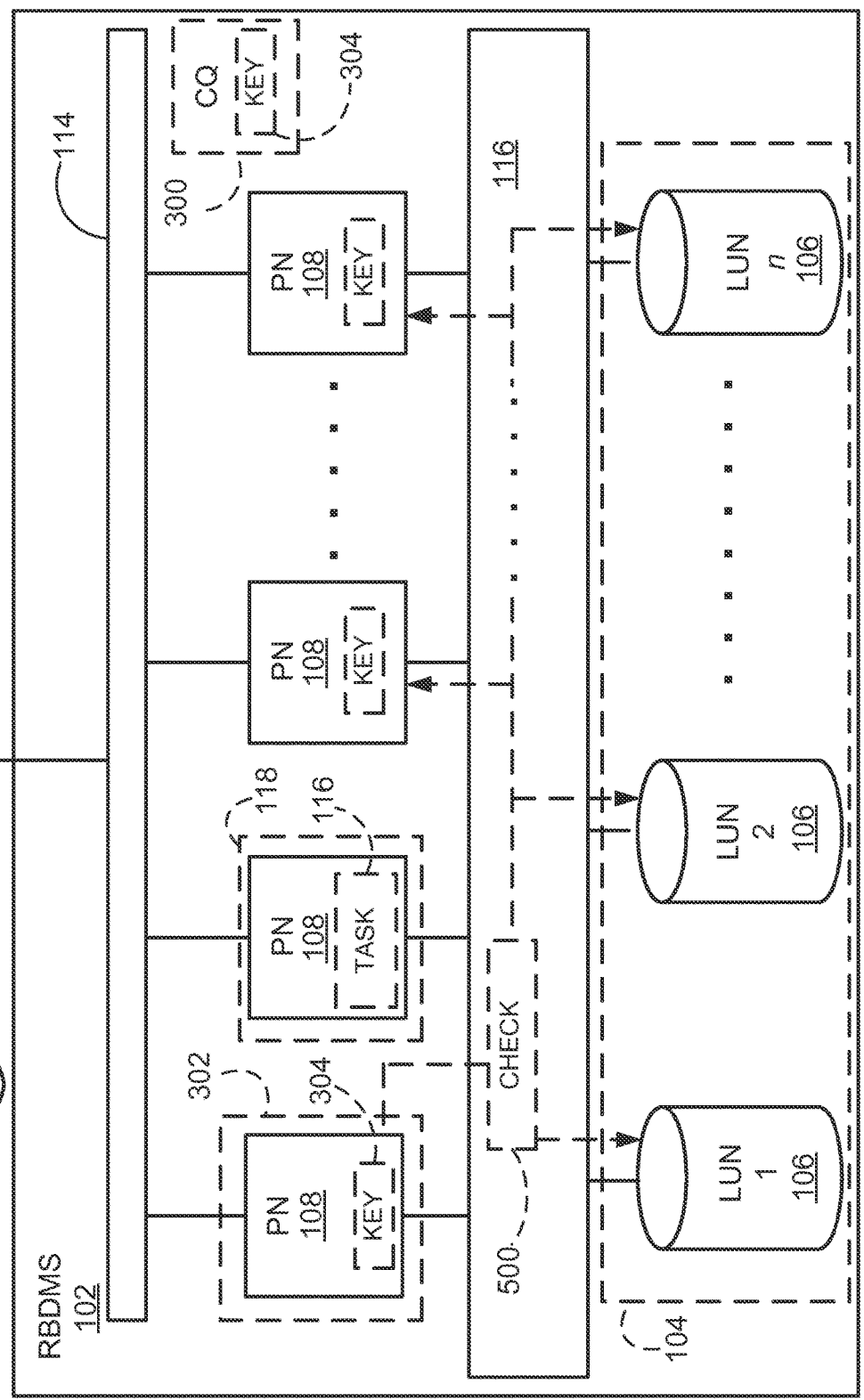
FIG. 5 is another block diagram of the example database of FIG. 1 during the non-responsive node avoidance scheme execution.

The check node 302 may also perform a reservation operation 402 at each eligible LUN 106 via the disk controller 116. In one example, the reservation operation 402 may be a "Write Exclusive Registrants Only" reservation associated with SCSI-3 and later protocols. This type of registration provides no exclusivity regarding reading data on the LUNs 106, but does allow only registered processing nodes 108 to write to the LUNs 106. Following the reservation operation 402, the check node 302 may perform a check operation 500 (see FIG. 5) to determine if any physical disk sharing, or access modules 206 and allocator assignments need changed due to any configuration changes on startup that have occurred, such as the addition or removal of LUNs 106 or access modules 206, for example.

Figure 6:
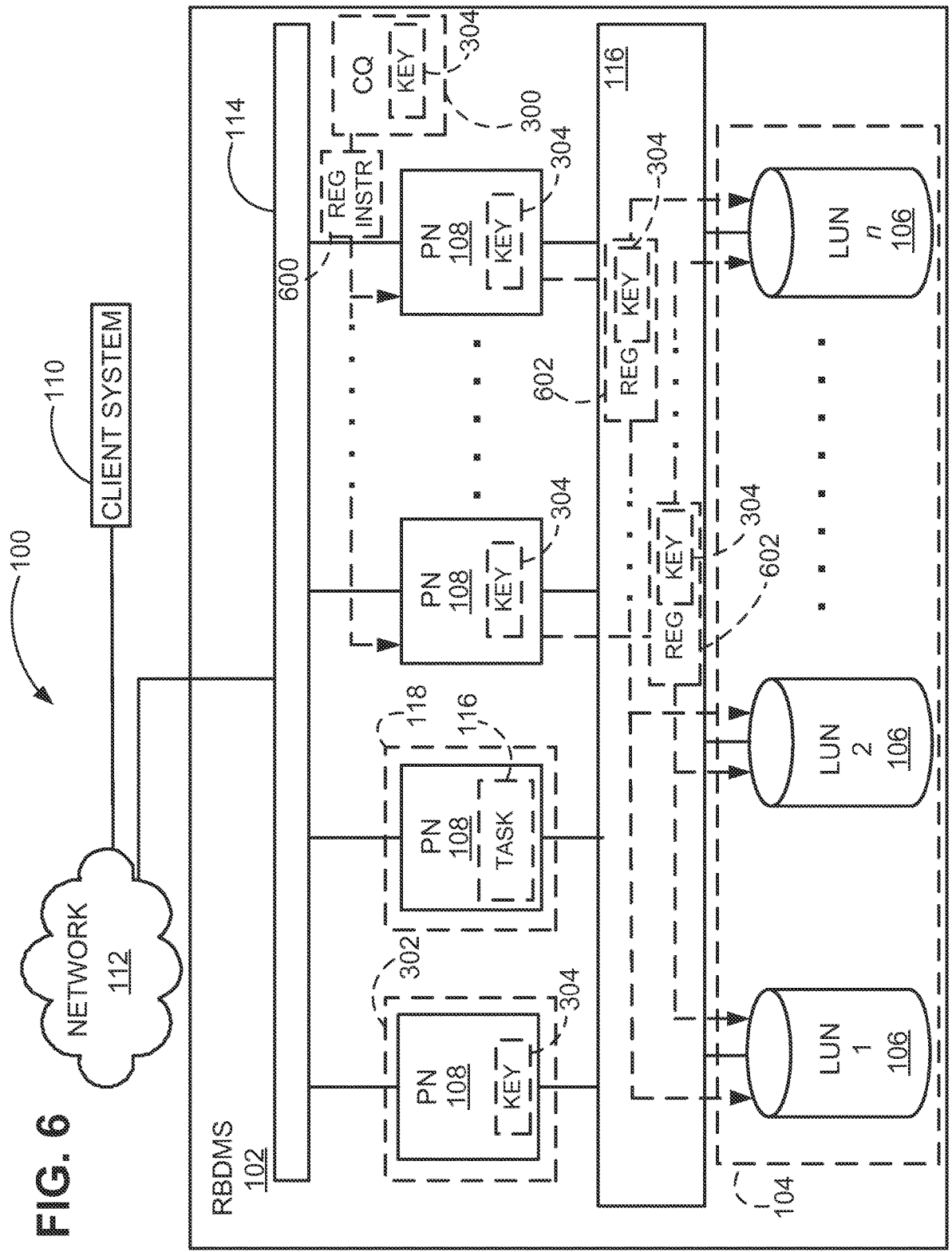
FIG. 6 is another block diagram of the example database of FIG. 1 during the non-responsive node avoidance scheme execution.

The clique coordinator 300 may instruct all of the processing nodes 108, excluding non-responsive nodes, to register (see FIG. 6) with the new registration key 304 at each eligible LUN 106 via the disk controller 116. Registration instructions 600 may be provided by the clique coordinator 300 to each processing node 108 that is to register. In one example, each processing node 108 may perform registration operations 602 using a "Register and Ignore Existing Key" function for SCSI-3 and later protocols that both registers the new registration key 304 with a processing node and instructs the processing node 108 to ignore any previously-existing registration keys. Once these registration operations 602 have taken place, the properly-operating processing nodes 108 may begin writing to eligible LUNs 106.

FIG. 7 is an operational flow diagram of example operation the database system 100 during new registration key creation and implementation. During operation of the database system 100, a non-responsive processing node, such as the non-responsive node 120 may be detected (700). In one example, non-responsive nodes may be detected by another processing node 108 during communication with the non-responsive node or through another subsystem of the database 100. Upon detection of non-responsive node(s), the RDBMS 102 may initiate system restart operations (702). In one example, during startup various operations may be carried out, such as selecting cliques and selection of a check node 302 from the available processing nodes 108 (704). Various selection techniques may be implemented, such as selecting a lowest-numbered, properly-functioning processing node 108. Alternatively, other suitable check node selection techniques may be implemented.

Upon selection of the check node 302, the eligibility and verification of the LUNs 106 to receive a new registration key may be determined (706). In one example, eligibility of LUNs 106 may be determined based on the various eligibility-determination criteria. If eligible LUNs 106 are detected, for each unique LUN 106 found, verification that eligible LUNs 106 are referenced by a non-skipped physical disk link, an alignment partition, or are unused may be made. For each unique LUN 106, verification may also be made regarding that each unique LUN 106 or corresponding physical disk(s) support persistent reservation functions, such as those included in SCSI-3 and later protocols. If a LUN 106 or corresponding physical disk(s) do not support such functions, the LUN 106 is to be skipped. If no LUNs 106 are ineligible or all LUNs 106 are skipped, the new registration key 304 cannot be implemented.

If at least one LUN 106 is eligible and verified, the new registration key 304 may be generated (708), such as by the clique coordinator 300. The new registration key 304 may be provided to properly operating registration nodes (710). The new registration key 304 may be registered at the LUNs 106 via the disk controller 112 (712). Registration may be performed by the check node 302. Upon registration, examination of existing reservations in the eligible/verified LUNs 106 and abort the existing reservations if present (714), which may be performed by the check node 302. A reservation may be made at each eligible/verified LUN 106 (716). In one example, the reservation may be a "Write Exclusive Registrants Only" reservation used in SCSI-3 and later protocols.

A check operation 500 may be performed to determine if any physical disk sharing, or access modules 206 and allocator assignments need changed due to any configuration changes on startup that have occurred may be performed by the check node 302 (718). The clique coordinator 300 may instruct all of the processing nodes 108, excluding non-responsive nodes, to perform registration operations 602 using the new registration key 304 at each eligible LUN 106 via the disk controller 112 (720). In one example, each processing node 108 may use a "Register and Ignore Existing Key" function for SCSI-3 and later protocols that both registers the new registration key 304 with a processing node and instructs the processing node 108 to ignore any previously-existing registration keys. Once this is provided to the properly-operating processing nodes 108, those processing nodes 108 may begin writing to eligible LUNs 106 at the appropriate times (722).

While various examples of the invention have been described, it will be apparent to those of ordinary skill in the art that many more examples and implementations are possible within the scope of the invention. For example, a database system has been used to provide various examples. However, other data stores, such as file systems, for example, or any other suitable data store may be implemented with the various examples. Accordingly, the invention is not to be restricted except in light of the attached claims and their equivalents.

We claim:

1. A method of operating a data store system comprising:
   identifying a non-responsive processing node from a plurality of processing nodes;
   generating a new registration key in response to identifying the non-responsive processing node; and
   providing the new registration key to the other processing nodes of the plurality of processing nodes excluding the identified non-responsive node, wherein each processing node provided the new registration key is authorized to access a plurality of storage devices of a storage array in communication with the plurality of processing nodes.

2. The method of claim 1, further comprising:
   selecting a processing node from the plurality of processing nodes; and
   registering, with the selected processing node, the new registration key with a plurality of logical units of the plurality of storage devices, wherein, for each logical unit, registration of the new registration key overtakes any existing reservations of a logical unit.

3. The method of claim 2, further comprising:
examining, with the selected processing node, each logical unit of the plurality of logical units to determine if each logical unit has at least one preexisting registered registration key; and
aborting, with the selected processing node, for each logical unit, each preexisting registration having a corresponding preexisting registered registration key.

4. The method of claim 2, further comprising performing, with the selected node, a reservation at each logical unit of the plurality of storage devices.

5. The method of claim 2, further comprising instructing each of the other processing nodes having a new registration key to register with each logical unit of the plurality of storage devices.

6. The method of claim 2, further comprising:
identifying, with the selected processing node, a plurality of logical units of the plurality of storage devices;
determining, with the selected processing node, eligibility of each logical unit to be used with the new registration key; and
excluding, with the selected processing node, each logical unit from being used with the new registration key determined to be ineligible.

7. The method of claim 1, wherein generating the new registration key comprises generating, with the selected processing node, the new registration key comprising a plurality of bytes indicative of at least one of the selected processing node, identification of the data store system, number of restarts of the data store system, and number of total processing nodes excluding the identified non-responsive node.

8. A computer-readable medium encoded with a plurality of instructions executable by a processor, the plurality of instructions comprising:
instructions to identify a non-responsive processing node from a plurality of processing nodes;
instructions to generate a registration key in response to identification of the nonresponsive processing node; and
instructions to provide the new registration key to a subset of processing nodes of the plurality of processing nodes, wherein the subset of processing nodes excludes the identified non-responsive node, wherein each processing node provided the new registration key is authorized to access a plurality of storage devices of a storage array in communication with the plurality of processing nodes.

9. The computer-readable medium of claim 8, wherein the plurality of instructions further comprises instructions to register the new registration key with a plurality of logical units of the plurality of storage devices, wherein, for each logical unit, registration of the new registration key overtakes any existing reservations of a logical unit.

10. The computer-readable medium of claim 9, wherein the plurality of instructions further comprises:
instructions to examine each logical unit of the plurality of logical units to determine if each logical unit has at least one preexisting registered registration key; and
instructions to abort, for each logical unit, each preexisting registration having a corresponding preexisting registered registration key.

11. The computer-readable medium of claim 9, wherein the plurality of instructions further comprises instructions to perform a reservation at each logical unit of the plurality of storage devices.

12. The computer-readable medium of claim 9, wherein the plurality of instructions further comprises instructions to direct each processing node of the subset having a new registration key to register with each logical unit of the plurality of storage devices.

13. The computer-readable medium of claim 8, wherein the plurality of instructions further comprises:
instructions to identify a plurality of logical units of the plurality of storage devices;
instructions to determine eligibility of each logical unit to be used with the new registration key; and instructions to exclude each logical unit from being used with the new registration key determined to be ineligible.

14. A data store system comprising:
a storage array comprising a plurality of storage devices;
an array of processing nodes in communication with the storage array, wherein at least one of the processing nodes is a non-responsive node; and
a coordination module configured to be executed by at least one processor to cause the at least one processor to:
generate a new registration key; and
provide the new registration key to the plurality of processing nodes excluding the identified non-responsive node, wherein each processing node provided the new registration key is authorized to access the plurality of storage devices of a storage array in communication with the plurality of processing nodes.

15. The data store system of claim 14, wherein coordination module is further configured to be executed by the at least one processor to cause the processor to select a processing node from the array of processing nodes excluding the non-responsive node, wherein the selected processing node is further configured to register the new registration key with a plurality of logical units of the plurality of storage devices, wherein, for each logical unit, registration of the new registration key overtakes any existing reservations of a logical unit.

16. The data store system of claim 15, wherein the selected processing node is further configured to:
determine if each logical unit of the plurality of logical units has at least one preexisting registered registration key; and
abort, for each logical unit, each preexisting registration having a corresponding preexisting registered registration key.

17. The data store system of claim 15, wherein the selected processing node is further configured to perform a reservation operation at each logical unit of the plurality of storage devices.

18. The data store system of claim 15, wherein the coordination module is further configured to be executed by the at least one processor to cause the at least one processor to instruct each of the plurality of processing nodes having a new registration key excluding the selected processing node to register with each logical unit of the plurality of storage devices.

19. The data store system of claim 14, wherein the selected processing node is further configured to:
identify a plurality of logical units of the plurality of storage devices;
determine eligibility of each logical unit to be used with the new registration key; and exclude each logical unit from being used with the new registration key determined to be ineligible.

20. The data store system of claim 14, wherein the new registration key comprises a plurality of bytes indicative of at least one of the selected processing node, identification of the data store system, number of restarts of the data store system, and number of total processing nodes excluding the identified non-responsive node.

\* \* \* \* \*